US012611728B2

(12) United States Patent
Kise et al.

(10) Patent No.: US 12,611,728 B2
(45) Date of Patent: Apr. 28, 2026

(54) LASER PROCESSING APPARATUS

(71) Applicant: DISCO CORPORATION, Tokyo (JP)

(72) Inventors: Taizo Kise, Tokyo (JP); Shogo Matsuda, Tokyo (JP); Taiki Sawabe, Tokyo (JP); Nobumori Ogoshi, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 714 days.

(21) Appl. No.: 18/149,243

(22) Filed: Jan. 3, 2023

(65) Prior Publication Data

US 2023/0219164 A1     Jul. 13, 2023

(30) Foreign Application Priority Data

Jan. 12, 2022     (JP) ................................. 2022-002903

(51) Int. Cl.
    B23K 26/03 (2006.01)
    B23K 26/046 (2014.01)
    B23K 26/08 (2014.01)
(52) U.S. Cl.
    CPC .......... B23K 26/032 (2013.01); B23K 26/046 (2013.01); B23K 26/0853 (2013.01)
(58) Field of Classification Search
    CPC .......................... B23K 26/0853; B23K 26/032; B23K 26/046; B23K 26/53
    See application file for complete search history.

(56) References Cited

U.S. PATENT DOCUMENTS

2005/0236381 A1 *  10/2005  Nomaru ............... B23K 26/042
                                                             219/121.75
2020/0411338 A1    12/2020  Mori et al.

FOREIGN PATENT DOCUMENTS

| JP | 2005313182 A | 11/2005 |
|---|---|---|
| JP | 2007152355 A | 6/2007 |
| JP | 2018129541 A | * 8/2018 |
| WO | 2019198512 A1 | 10/2019 |

OTHER PUBLICATIONS

Office Action issued in counterpart Singapore patent application No. 10202260462P, dated Jul. 25, 2025.
Office Action issued in counterpart Japanese patent application No. 2022-002903, dated Jul. 29, 2025.

* cited by examiner

*Primary Examiner* — Thien S Tran
(74) *Attorney, Agent, or Firm* — Greer Burns & Crain Ltd.

(57)     ABSTRACT

A laser processing apparatus includes a laser beam applying unit for applying a laser beam to a wafer. The laser beam applying unit includes a laser oscillator for emitting the laser beam, a beam condenser for focusing the laser beam emitted from the laser oscillator into a focused spot and positioning the focused spot in the wafer held on a chuck table, a focused spot position adjuster disposed between the laser oscillator and the beam condenser for adjusting the position of the focused spot, and an upper surface position detector for detecting the position of an upper surface of the wafer. The upper surface position detector includes a first upper surface position detecting unit, a second upper surface position detecting unit, and a selector for selecting either the first upper surface position detecting unit or the second upper surface position detecting unit depending on a feature of the wafer.

3 Claims, 8 Drawing Sheets

ANGLE ( θ )

OPTICAL PATH LENGTH(d1)

DISTANCE FROM UPPER SURFACE OF WAFER TO FOCUSED SPOT ($\mu$m)

FIG.10

LASER PROCESSING APPARATUS

BACKGROUND OF THE INVENTION

Field of the Invention

The present invention relates to a laser processing apparatus.

Description of the Related Art

Wafers with a plurality of devices, such as integrated circuits (ICs) and large-scale integration (LSI) circuits, formed in respective areas demarcated on a face side thereof by a plurality of intersecting projected dicing lines are thinned down to a desired thickness by grinding their reverse side, after which the wafers are divided into individual device chips by a laser processing apparatus.

The laser processing apparatus includes a chuck table for holding a wafer thereon, a laser beam applying unit for applying a laser beam to the wafer held on the chuck table, and a feeding mechanism for processing-feeding the chuck table and the laser beam applying unit relatively to each other in X-axis directions and Y-axis directions perpendicular to the X-axis directions. The laser processing apparatus is able to apply the laser beam highly accurately to the projected dicing lines on the wafer.

There is known a technology for applying a laser beam whose wavelength is transmittable through a wafer to the wafer while positioning a focused spot of the laser beam within the wafer along projected dicing lines on the wafer, thereby producing modified layers in the wafer, and thereafter exerting external forces to the wafer to break the wafer along the modified layers, thereby dividing the wafer into individual device chips. According to the technology, it is necessary to position the focused spot of the laser beam in the wafer at an appropriate position spaced from an upper surface of the wafer. The applicant of the present invention has developed technologies for controlling the position of the focused spot of the laser beam while measuring the vertical position, i.e., the height, of the upper surface of the wafer (see, for example, Japanese Patent Laid-open Nos. 2005-313182 and 2007-152355).

The technology disclosed in Japanese Patent Laid-open No. 2005-313182 is of a first type in which detecting light emitted from a detecting light source is applied to the upper surface of a wafer at an angle α of incidence and an image sensor detects the position of light reflected by the upper surface of the wafer, so that the position of the upper surface of the wafer can be calculated from the position of the reflected light detected by the image sensor.

The technology disclosed in Japanese Patent Laid-open No. 2007-152355 is of a second type in which detecting light emitted from a detecting light source is applied to the upper surface of a wafer held on a chuck table through a beam condenser, returning light reflected by the upper surface of the wafer is branched into a first optical path and a second optical path, and the intensity of the returning light that has passed through a slit mask disposed on the first optical path and the intensity of the returning light that has been led to the second optical path are compared with each other to calculate the position of the upper surface of the wafer.

SUMMARY OF THE INVENTION

Different kinds and different surface conditions of wafers tend to make the measurement according to the first type preferable for some wafers and to make the measurement according to the second type preferable for other wafers. Consequently, a laser processing apparatus including a measuring instrument of the first type and a laser processing apparatus including a measuring instrument of the second type need to be available for processing a variety of different kinds of wafers. However, keeping the laser processing apparatuses of the different types ready for use is uneconomical.

It is therefore an object of the present invention to provide a laser processing apparatus that will solve the problem of uneconomically having to keep both a laser processing apparatus including a measuring instrument of the first type and a laser processing apparatus including a measuring instrument of the second type ready for use.

In accordance with an aspect of the present invention, there is provided a laser processing apparatus including a chuck table for holding a wafer thereon, a laser beam applying unit for applying a laser beam to the wafer held on the chuck table, and a feeding mechanism for processing-feeding the chuck table and the laser beam applying unit relatively to each other in X-axis directions and Y-axis directions perpendicular to the X-axis directions. The laser beam applying unit includes a laser oscillator for emitting a laser beam, a beam condenser for focusing the laser beam emitted from the laser oscillator into a focused spot and positioning the focused spot in the wafer held on the chuck table, a focused spot position adjuster disposed between the laser oscillator and the beam condenser for adjusting the position of the focused spot, and an upper surface position detector for detecting a position of an upper surface of the wafer. The upper surface position detector includes a first upper surface position detecting unit, a second upper surface position detecting unit, and a selector for selecting either the first upper surface position detecting unit or the second upper surface position detecting unit depending on a feature of the wafer.

Preferably, the first upper surface position detecting unit includes a detecting light source, a combiner for combining detecting light that is emitted from the detecting light source and that has passed through a first beam splitter with the laser beam between the laser oscillator and the focused spot position adjuster, a second beam splitter for branching returning light that is reflected by the upper surface of the wafer held on the chuck table when the detecting light that has passed through the focused spot position adjuster and the beam condenser is applied to the wafer and that is also reflected by the combiner and the first beam splitter, into a first optical path and a second optical path, a filter disposed on the first optical path for passing part of the branched returning light therethrough, a first photodetector for detecting the returning light that has passed through the filter, and a second photodetector disposed on the second optical path for detecting the branched returning light in its entirety, the laser processing apparatus further including a controller for calculating the position of the upper surface of the wafer from a comparison between an amount of the returning light detected by the first photodetector and an amount of the returning light detected by the second photodetector.

Preferably, the second upper surface position detecting unit includes a light applying end member for applying the detecting light emitted from the detecting light source to the upper surface of the wafer at an angle α of incidence, a light detecting end member for detecting reflected light produced when the detecting light applied by the light applying end member is reflected by the upper surface of the wafer, and an image sensor for measuring a position of the reflected light detected by the light detecting end member, and the controller calculates the position of the upper surface of the wafer on the basis of the position on the image sensor of the reflected light detected by the image sensor.

Preferably, the detecting light emitted from the detecting light source is guided to the first beam splitter, and the selector guides the detecting light branched by the first beam splitter selectively to the first upper surface position detecting unit and the second upper surface position detecting unit by switching a first shutter and a second shutter to different positions.

Preferably, the controller controls the focused spot position adjuster depending on the position of the upper surface of the wafer calculated on the basis of data from the first upper surface position detecting unit or the second upper surface position detecting unit selected by the selector.

The laser processing apparatus according to the aspect of the present invention is able to solve the problem of uneconomically having to keep both a laser processing apparatus including a measuring instrument of the first type and a laser processing apparatus including a measuring instrument of the second type ready for use.

The above and other objects, features and advantages of the present invention and the manner of realizing them will become more apparent, and the invention itself will best be understood from a study of the following description and appended claims with reference to the attached drawings showing a preferred embodiment of the invention.

BRIEF DESCRIPTION OF THE DRAWINGS

FIG. 10 is a schematic view illustrating the manner in which the second upper surface position detecting unit illustrated in FIG. 9 detects the position of the upper surface of the wafer.

DETAILED DESCRIPTION OF THE PREFERRED EMBODIMENT

Figure 1:
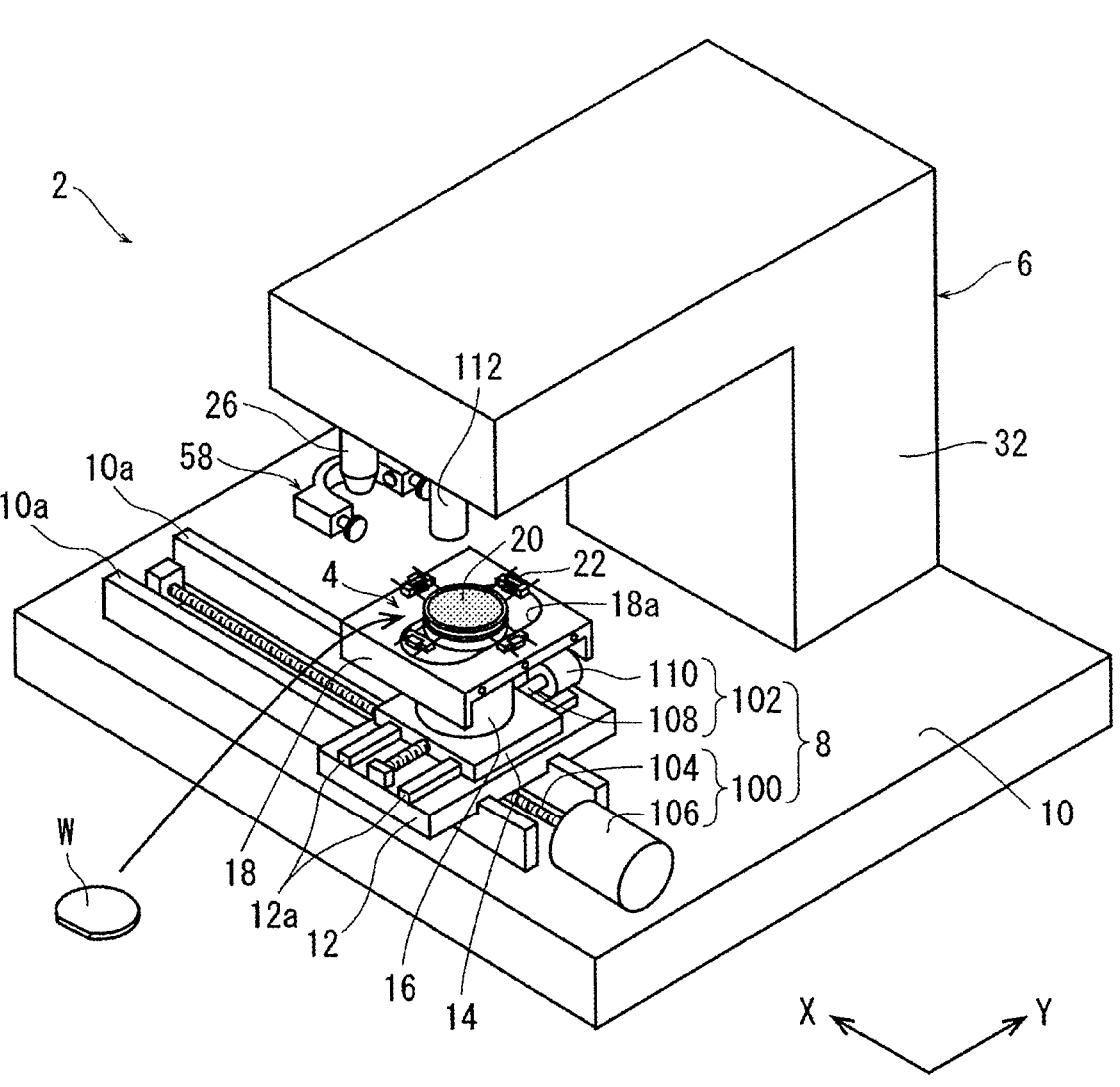
FIG. 1 is a perspective view of a laser processing apparatus according to an embodiment of the present invention.

A laser processing apparatus according to a preferred embodiment of the present invention will be described in detail below with reference to the accompanying drawings. As illustrated in FIG. 1, the laser processing apparatus, denoted by 2, includes a chuck table 4 for holding a wafer W thereon, a laser beam applying unit 6 for applying a laser beam to the wafer W held on the chuck table 4, and a feeding mechanism 8 for processing-feeding the chuck table 4 and the laser beam applying unit 6 in X-axis directions along an X-axis indicated by an arrow X and Y-axis directions along a Y-axis indicated by an arrow Y perpendicular to the X-axis directions. The X-axis and the Y-axis jointly define an XY plane that lies essentially horizontally.

The laser processing apparatus 2 also includes an X-axis movable plate 12 movably mounted on an upper surface of a base 10 for movement along the X-axis, a Y-axis movable plate 14 movably mounted on an upper surface of the X-axis movable plate 12 for movement along the Y-axis, a support post 16 fixed to an upper surface of the Y-axis movable plate 14, and a cover plate 18 fixed to an upper end of the support post 16. The cover plate 18 has an oblong hole 18a defined therein that is elongate along the Y-axis and open vertically. The chuck table 4 is rotatably mounted on the upper end of the support post 16 and extends upwardly through the oblong hole 18a in the cover plate 18.

A circular porous suction chuck 20 that is fluidly connected to suction means, not illustrated, is disposed on an upper end face of the chuck table 4. A plurality of clamps 22 are attached to an outer circumferential edge of the chuck table 4 at circumferentially spaced intervals.

The chuck table 4 holds the wafer W on an upper surface of the suction chuck 20 under suction forces that are generated by the suction means and are applied to the upper surface of the suction chuck 20. The chuck table 4 is rotatable about a vertical central axis thereof by a chuck table motor, not illustrated, housed in the support post 16.

Figure 2:
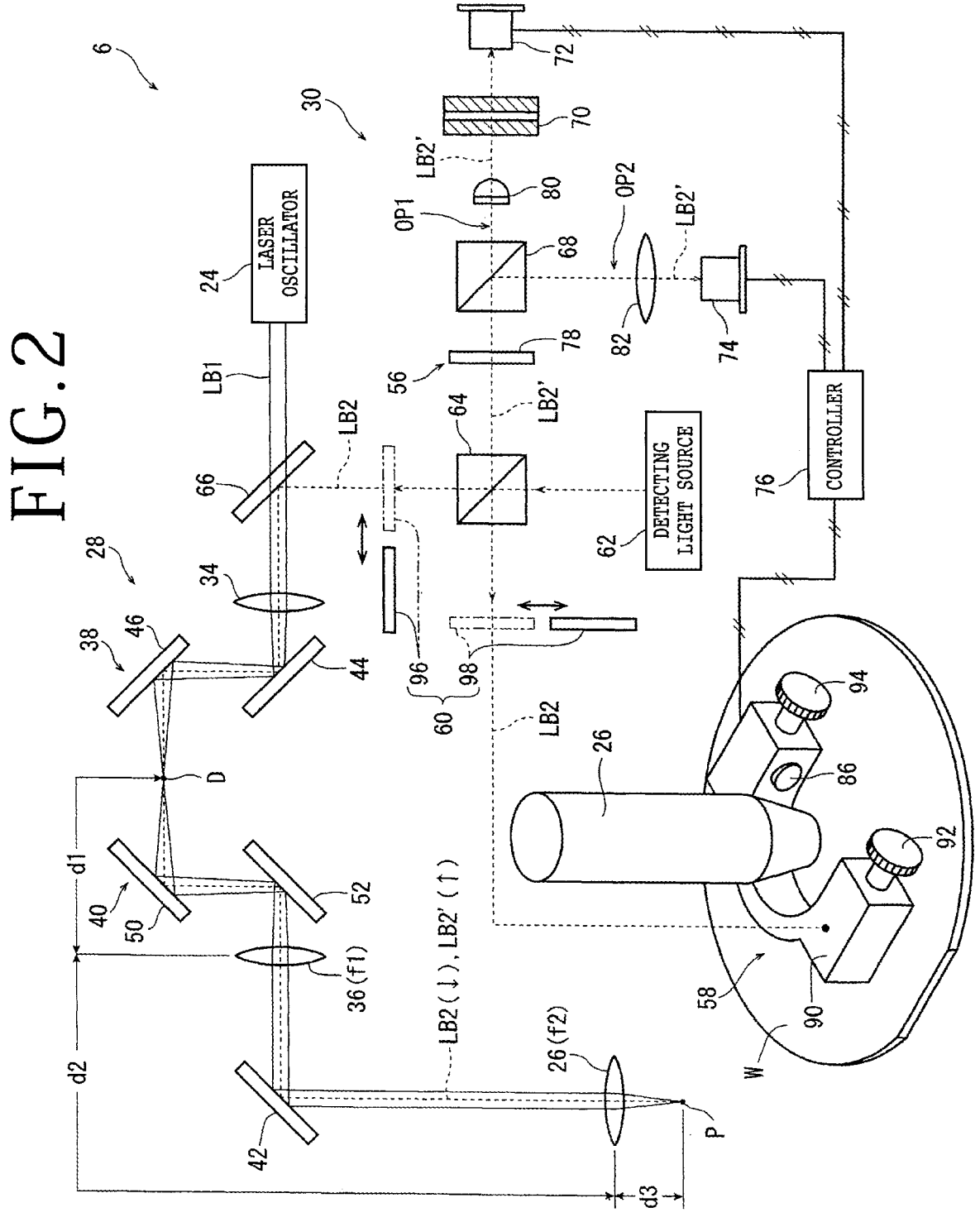
FIG. 2 is a schematic view, partly in block form, of a laser beam applying unit of the laser processing apparatus illustrated in FIG. 1.

As illustrated in FIG. 2, the laser beam applying unit 6 includes a laser oscillator 24 for emitting a processing pulsed laser beam LB1, a beam condenser 26 for focusing the laser beam LB1 emitted from the laser oscillator 24 into a focused spot P and positioning the focused spot P on the wafer W held on the chuck table 4, a focused spot position adjuster 28 disposed between the laser oscillator 24 and the beam condenser 26 for adjusting the position of the focused spot P, and an upper surface position detector 30 for detecting the position of an upper surface of the wafer W.

As illustrated in FIG. 1, the laser beam applying unit 6 includes a housing 32 extending upwardly from the upper surface of the base 10 and having an upper arm extending essentially horizontally in overhanging relation to the chuck table 4. The laser oscillator 24 is disposed in the housing 32. The laser beam LB1 emitted from the laser oscillator 24 may have a wavelength of 1064 nm, for example, that is transmittable through the wafer W. The beam condenser 26 is mounted on a lower surface of a distal end of the upper arm of the housing 32.

As illustrated in FIG. 2, the focused spot position adjuster 28 includes first and second lenses 34 and 36 spaced from each other, a first galvanoscanner 38 for reflecting the laser beam LB1 that has passed through the first lens 34, and a second galvanoscanner 40 for reflecting the laser beam LB1 that has been reflected by the first galvanoscanner 38 to travel to the second lens 36. A direction changing mirror 42 is positioned between the second lens 36 and the beam condenser 26 for guiding the laser beam LB1 that has passed through the second lens 36 toward the beam condenser 26.

Figure 3:
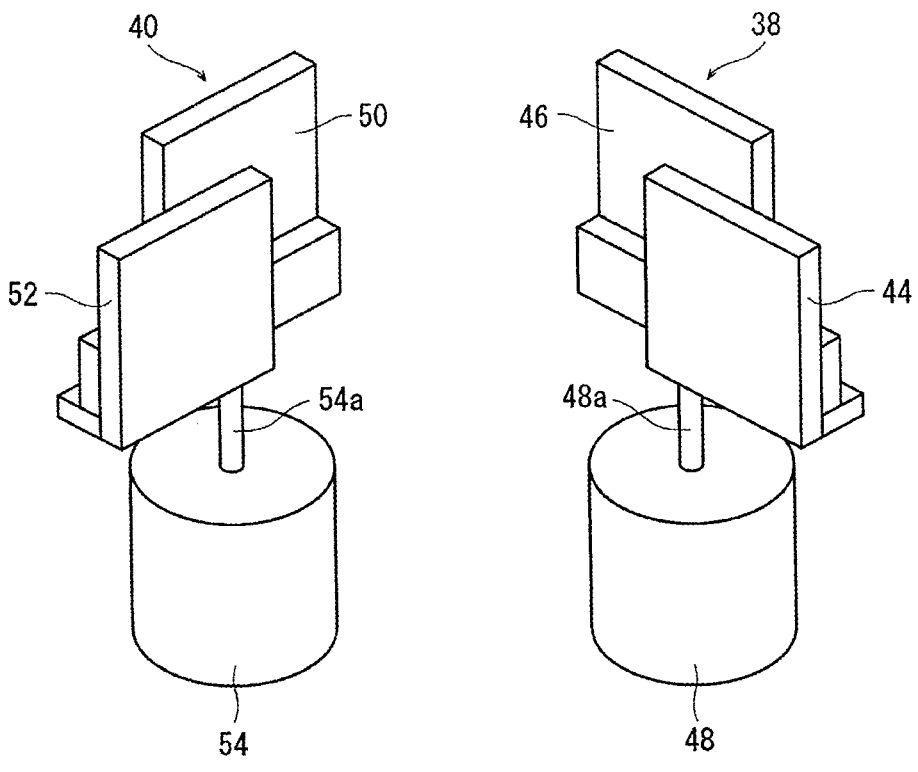
FIG. 3 is a perspective view of a pair of first and second galvanoscanners of the laser beam applying unit illustrated in FIG. 2.

As illustrated in FIGS. 2 and 3, the first galvanoscanner 38 has a pair of first and second mirrors 44 and 46 spaced from each other by a predetermined distance and facing each other parallel to each other, and an angle adjusting actuator 48 (see FIG. 3) for adjusting an installed angle of the first and second mirrors 44 and 46.

As illustrated in FIG. 2, the first mirror 44 reflects the laser beam LB1 that has passed through the first lens 34 to travel toward the second mirror 46. The second mirror 46 reflects the laser beam LB1 that has been reflected by the first mirror 44 to travel toward the second galvanoscanner 40.

As illustrated in FIG. 3, the angle adjusting actuator 48 has a rotational shaft 48a coupled to both of the first and second mirrors 44 and 46. The angle adjusting actuator 48 changes the installed angle of the first and second mirrors 44 and 46 with respect to an optical path of the laser beam LB1 while keeping the first and second mirrors 44 and 46 parallel to each other.

As with the first galvanoscanner 38, the second galvanoscanner 40 has a pair of third and fourth mirrors 50 and 52 spaced from each other by a predetermined distance and facing each other parallel to each other, and an angle adjusting actuator 54 for adjusting an installed angle of the third and fourth mirrors 50 and 52.

As illustrated in FIG. 2, the third mirror 50 reflects the laser beam LB1 that has been reflected by the second mirror 46 of the first galvanoscanner 38 to travel toward the fourth mirror 52. The fourth mirror 52 reflects the laser beam LB1 that has been reflected by the third mirror 50 to travel toward the second lens 36.

As illustrated in FIG. 3, the angle adjusting actuator 54 has a rotational shaft 54a coupled to both of the third and fourth mirrors 50 and 52. The angle adjusting actuator 54 changes the installed angle of the third and fourth mirrors 50 and 52 with respect to the optical path of the laser beam LB1 while keeping the third and fourth mirrors 50 and 52 parallel to each other.

Figure 4:
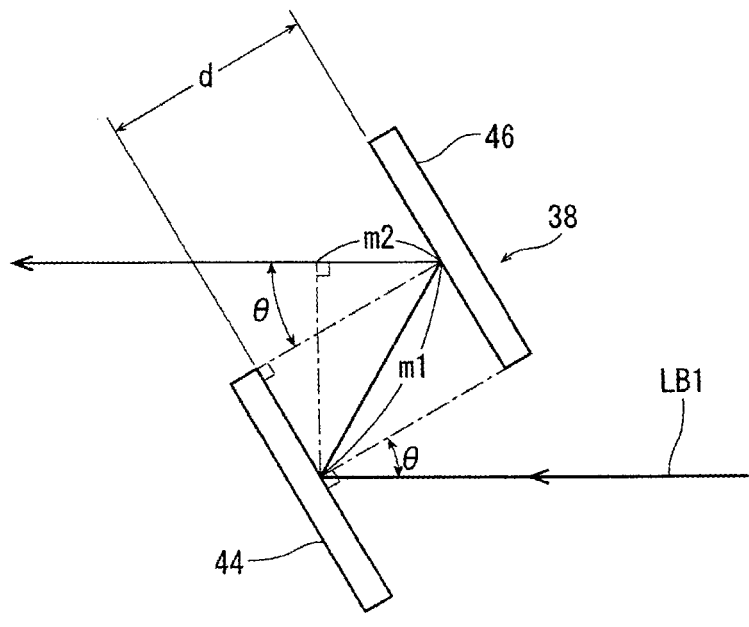
FIG. 4 is a schematic view illustrating an optical path length of a laser beam that passes through the first galvanoscanner illustrated in FIG. 3.

As described above, after the laser beam LB1 emitted from the laser oscillator 24 has passed through the first lens 34, the laser beam LB1 is reflected by the first and second mirrors 44 and 46. As illustrated in FIG. 4, providing the distance between the first mirror 44 and the second mirror 46 is indicated by d, distances m1 and m2 are expressed as follows:

$$m1 = d/\cos\theta$$

$$m2 = m1\cos 2\theta = (d/\cos\theta)\cos 2\theta$$

Therefore, the sum of the distances m1 and m2 is given by:

$$m1 + m2 = (d/\cos\theta)(1 + \cos 2\theta) = 2d\cos\theta$$

Figure 5:
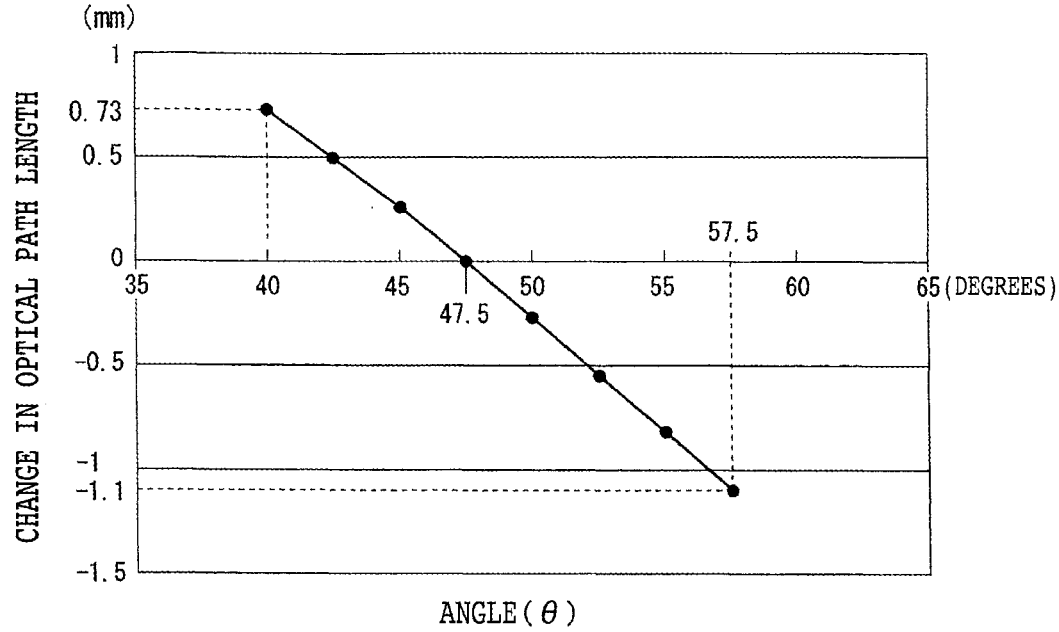
FIG. 5 is a graph illustrating a relation between installed angles of mirrors of the first and second galvanoscanners and changes in the optical path length of the laser beam.

Providing the distance between the third mirror 50 and the fourth mirror 52 is also indicated by d, an optical path length of the laser beam LB1 changes as (m1+m2)×2. If the distance d is 2 mm and the angle θ is 47.5 degrees in a reference state where the change in the optical path length of the laser beam LB1 is 0, then the optical path length of the laser beam LB1 changes as illustrated in FIG. 5. In FIG. 5, when the angle θ changes from 40 degrees to 57.5 degrees, the optical path length changes in a range of +0.73 to −1.1 mm. In other words, the change in the optical path length is 1.83 mm in the above angle range.

A relation between the change in the optical path length and the displacement of the position of the focused spot P of the laser beam LB1 focused by the beam condenser 26 will now be described below.

As illustrated in FIG. 2, providing the optical path length from a converging point D of the first lens 34 to the second lens 36 is indicated by d1, the optical path length from the second lens 36 to the beam condenser 26 by d2, a focal length of the second lens 36 by f1, and a focal length of the beam condenser 26 by f2, a distance d3 from the beam condenser 26 to the focused spot P can be determined according to the following equation (1):

$$d3 = \frac{d1 + d2\left(-\dfrac{d1}{f1} + 1\right)}{\dfrac{1}{f2}\left\{d1 + d2\left(-\dfrac{d1}{f1} + 1\right)\right\} - \left(-\dfrac{d1}{f1} + 1\right)} \tag{1}$$

If the laser beam LB1 emitted from the laser oscillator 24 is a collimated beam, then the converging point D of the first lens 34 coincides with the focal length of the first lens 34.

In the equation (1), if specific numerical values are assigned to the focal length f1 of the second lens 36, the focal length f2 of the beam condenser 26, and the optical path length d2 from the second lens 36 to the beam condenser 26, then the distance d3 from the beam condenser 26 to the focused spot P is a function of the optical path length d1 from the converging point D of the first lens 34 to the second lens 36. In other words, when the optical path length d1 changes, the position of the focused spot P changes.

Figure 6:
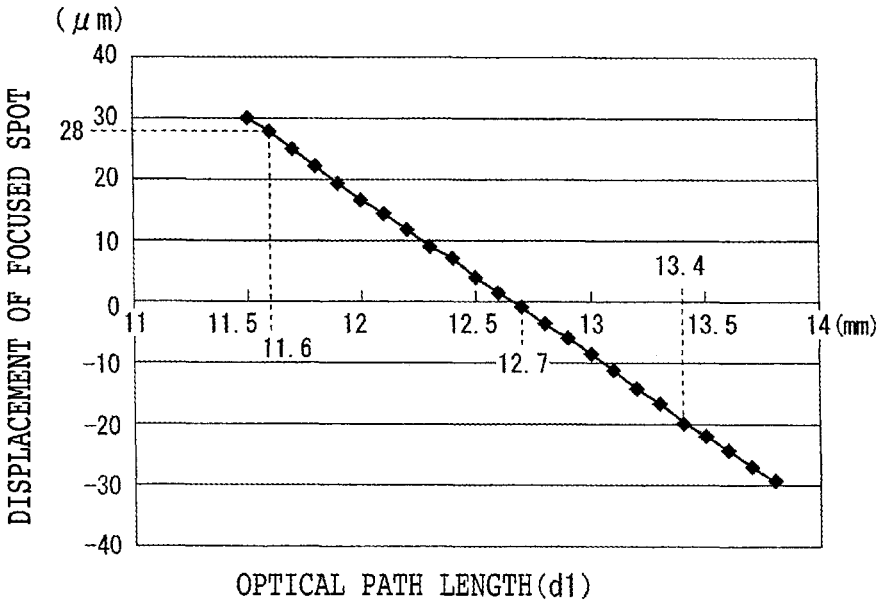
FIG. 6 is a graph illustrating a relation between changes in the optical path length of the laser beam and changes in the distance from a beam condenser to a focused spot of the laser beam.

For example, if the focal length f1 of the second lens 36 is 12.7 mm, the focal length f2 of the beam condenser 26 is 2 mm, the optical path length d2 is 20 mm, and the optical path length d1 coincides with the focal length f1 (12.7 mm) of the second lens 36 in a reference state where the displacement of the focused spot P is 0, then as the optical path length d1 changes, the focused spot P is displaced as illustrated in FIG. 6.

Consequently, under the conditions described above, when the angle θ changes in the range of 40 to 57.5 degrees, the optical path length d1 changes in the range of +0.73 to −1.1 mm, and the distance d3 from the beam condenser 26 to the focused spot P changes in a range of −20 to +28 μm. The focused spot position adjuster 28 adjusts the vertical position of the focused spot P by adjusting the installed angles of the first through fourth mirrors 44, 46, 50, and 52 with the angle adjusting actuators 48 and 54.

As illustrated in FIG. 2, the upper surface position detector 30 includes a first upper surface position detecting unit 56, a second upper surface position detecting unit 58, and a selector 60.

The first upper surface position detecting unit 56 includes a detecting light source 62, a combiner 66 for combining detecting light LB2 that is emitted from the detecting light source 62 and that has passed through a first beam splitter 64 with the laser beam LB1 between the laser oscillator 24 and the focused spot position adjuster 28, a second beam splitter 68 for branching returning light LB2' that is reflected by the upper surface of the wafer W when the detecting light LB2 that has passed through the focused spot position adjuster 28 and the beam condenser 26 is applied to the wafer W and that is also reflected by the combiner 66 and the first beam splitter 64, into a first optical path OP1 and a second optical path OP2, a filter 70 disposed on the first optical path OP1 for passing part of the branched returning light LB2' therethrough, a first photodetector 72 for detecting the returning light LB2' that has passed through the filter 70, and a second photodetector 74 disposed on the second optical path OP2 for detecting the branched returning light LB2' in its entirety.

The detecting light source 62 emits as the detecting light LB2 a pulsed laser beam having a frequency of 632 nm, for example, different from the frequency of the processing laser beam LB1 emitted from the laser oscillator 24.

The combiner 66 may be configured from a dichroic half-silvered mirror. The combiner 66 passes therethrough the laser beam LB1 emitted from the laser oscillator 24 and also reflects the detecting light LB2 that is emitted from the detecting light source 62 and that has passed through the first beam splitter 64 to travel toward the focused spot position adjuster 28. The first and second photodetectors 72 and 74 output voltage signals representing respective amounts of detected returning light LB2' to a controller 76.

The controller 76 is configured from a computer for controlling operation of the components of the laser processing apparatus 2. The controller 76 includes a central processing unit (CPU) for performing arithmetic processing operations according to control programs, a read only memory (ROM) for storing the control programs and the like, and a readable/writable random access memory (RAN) for storing results of the arithmetic processing operations and the like.

According to the present embodiment, the first upper surface position detecting unit 56 further includes a bandpass filter 78 for passing therethrough only light corresponding to the frequency of the returning light LB2', which is the same as the frequency of the detecting light LB2, of the light led from the combiner 66 to the first beam splitter 64 and reflected by the first beam splitter 64, a cylindrical lens 80 for one-dimensionally converging the returning light LB2' branched into the first optical path OP1 by the second beam splitter 68, and a condensing lens 82 for converging 100% of the returning light LB2' branched into the second optical path OP2 by the second beam splitter 68.

After the detecting light LB2 emitted from the detecting light source 62 has passed through the first beam splitter 64, the detecting light LB2 is reflected toward the focused spot position adjuster 28 by the combiner 66 and then guided to the beam condenser 26 by the focused spot position adjuster 28 and the direction changing mirror 42. The detecting light LB2 that is focused by the beam condenser 26 is applied to and reflected by the upper surface of the wafer W held on the chuck table 4. At this time, the detecting light LB2 is focused into a focused spot Pa (see FIGS. 7A and 7B) positioned within the wafer W.

Figure 7A:
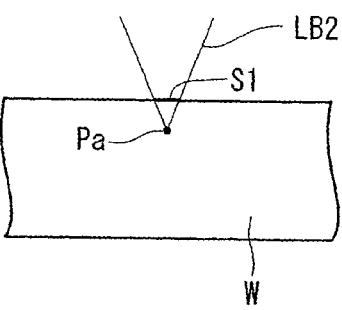
FIG. 7A is a fragmentary schematic view illustrating a reflection area at the time detecting light is applied to a wafer.

If the focused spot Pa of the detecting light LB2 is in a position relatively close to the upper surface of the wafer W as illustrated in FIG. 7A, the detecting light LB2 is reflected as the returning light LB2' from a relatively small area S1 of the upper surface of the wafer W to which the detecting light LB2 is applied.

The returning light LB2' reflected by the upper surface of the wafer W travels via the beam condenser 26, the direction changing mirror 42, the focused spot position adjuster 28, the combiner 66, and the first beam splitter 64 to the bandpass filter 78, as indicated by broken lines in FIG. 2.

When the detecting light LB2 is reflected as the returning light LB2' from the wafer W, the processing laser beam LB1 is also reflected as returning light from the wafer W and travels to the bandpass filter 78. However, the returning light as the reflected processing laser beam LB1 is blocked by the bandpass filter 78 because the bandpass filter 78 passes therethrough only light corresponding to the frequency of the returning light LB2', as described above. Therefore, only the returning light LB2' as the reflected detecting light LB2 passes through the bandpass filter 78.

The returning light LB2' that has passed through the bandpass filter 78 is branched into the first optical path OP1 and the second optical path OP2 by the second beam splitter 68. The returning light LB2' branched into the first optical path OP1 is one-dimensionally converged into a spot having an elliptical cross-sectional shape by the cylindrical lens 80. The spot having the elliptical cross-sectional shape into which the returning light LB2' has been converged is limited to a predetermined unit length by the filter 70, so that part of the returning light LB2' branched into the first optical path OP1 is detected by the first photodetector 72. The first photodetector 72 then outputs a voltage signal representing the amount of detected returning light LB2' to the controller 76.

Figure 7B:
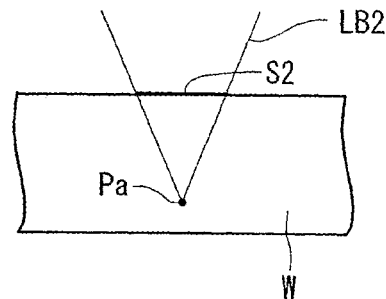
FIG. 7B is a fragmentary schematic view illustrating a reflection area at the time the detecting light is applied to the wafer with a focused spot thereof being positioned lower than in FIG. 7A.

If the focused spot Pa of the detecting light LB2 is in a position deeper than the position illustrated in FIG. 7A as illustrated in FIG. 7B, the detecting light LB2 is reflected as the returning light LB2' from a relatively large area S2 of the upper surface of the wafer W to which the detecting light LB2 is applied. The area S2 is larger than the area S1 (S2>S1). The returning light LB2' as the reflected detecting light LB2 from the area S2 is branched into the first optical path OP1 and one-dimensionally converged into a spot having an elliptical cross-sectional shape by the cylindrical lens 80. The spot having the elliptical cross-sectional shape into which the returning light LB2' as the reflected detecting light LB2 from the area S2 has a major axis longer than the major axis of the spot having the elliptical cross-sectional shape into which the returning light LB2' as the reflected detecting light LB2 from the area S1 has been converged.

The spot having the elliptical cross-sectional shape into which the returning light LB2' as the reflected detecting light LB2 from the area S2 has been converged is limited to a predetermined unit length by the filter 70, so that part of the returning light LB2' branched into the first optical path OP1 is detected by the first photodetector 72. Since the spot having the elliptical cross-sectional shape into which the returning light LB2' as the reflected detecting light LB2 from the area S1 has been converged is smaller than the spot having the elliptical cross-sectional shape into which the returning light LB2' as the reflected detecting light LB2 from the area S2, the amount of the returning light LB2' as the reflected detecting light LB2 from the area S1 detected by the first photodetector 72 is larger than the amount of the returning light LB2' as the reflected detecting light LB2 from the area S2 detected by the first photodetector 72.

As described above, the amount of the returning light detected by the first photodetector 72 is larger as the focused spot Pa of the detecting light LB2 is closer to the upper surface of the wafer W and smaller as the focused spot Pa of the detecting light LB2 is farther from the upper surface of the wafer W. Consequently, when the position of the upper surface of the wafer W, i.e., the position from which the detecting light LB2 is reflected, changes, the amount of the returning light detected by the first photodetector 72 changes, and also the voltage signal output from the first photodetector 72 changes.

On the other hand, inasmuch the returning light LB2' branched into the second optical path OP2 is converged 100% by the condensing lens 82, the returning light LB2' branched into the second optical path OP2 is detected in its entirety by the second photodetector 74. Consequently, the amount of the returning light detected by the second photodetector 74 does not change even when the position of the upper surface of the wafer W, i.e., the position from which the detecting light LB2 is reflected, changes. The amount of the returning light detected by the second photodetector 74 is larger than the amount of the returning light detected by the first photodetector 72, and the voltage signal output from the second photodetector 74 is constant.

Figure 8:
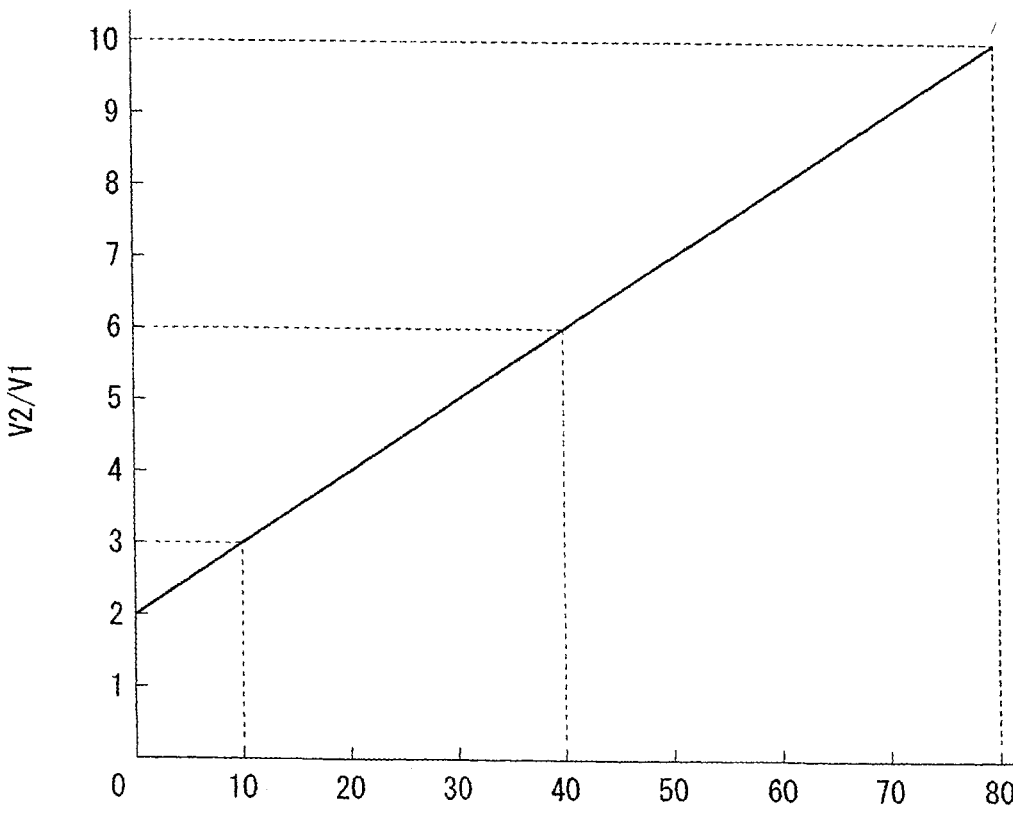
FIG. 8 is a graph illustrating a relation between the ratio of voltage signals output from first and second photodetectors of the laser beam applying unit illustrated in FIG. 2 and the distance from an upper surface of the wafer to the focused spot of detecting light.

A relation between a ratio (V2/V1) between a voltage signal V1 from the first photodetector 72 and a voltage signal V2 from the second photodetector 74 and a distance from the upper surface of the wafer W and the focused spot Pa of the detecting light LB2 is illustrated in a graph of FIG. 8.

The graph of FIG. 8 has a horizontal axis representing the distance (μm) from the upper surface of the wafer W to the focused spot Pa positioned in the wafer W. The graph of FIG. 8 has a vertical axis representing the ratio (V2/V1) between the voltage signal V1 from the first photodetector 72 and the voltage signal V2 from the second photodetector 74.

In FIG. 8, when the focused spot Pa is positioned in the wafer W at a depth of 10 μm from the upper surface of the wafer W, the ratio (V2/V1) of the voltage signals is 3, and when the focused spot Pa is positioned in the wafer W at a depth of 40 μm from the upper surface of the wafer W, the ratio (V2/V1) of the voltage signals is 6.

The controller 76 operates with the first upper surface position detecting unit 56 by calculating the position of the upper surface of the wafer W with respect to the position of the focused spot Pa of the detecting light LB2 from the comparison between the amount of the returning light LB2' that is detected by the first photodetector 72 and that changes depending on the position of the upper surface of the wafer W and the amount of the returning light LB2' that is detected by the second photodetector 74 and that does not change depending on the position of the upper surface of the wafer W.

Figure 9:
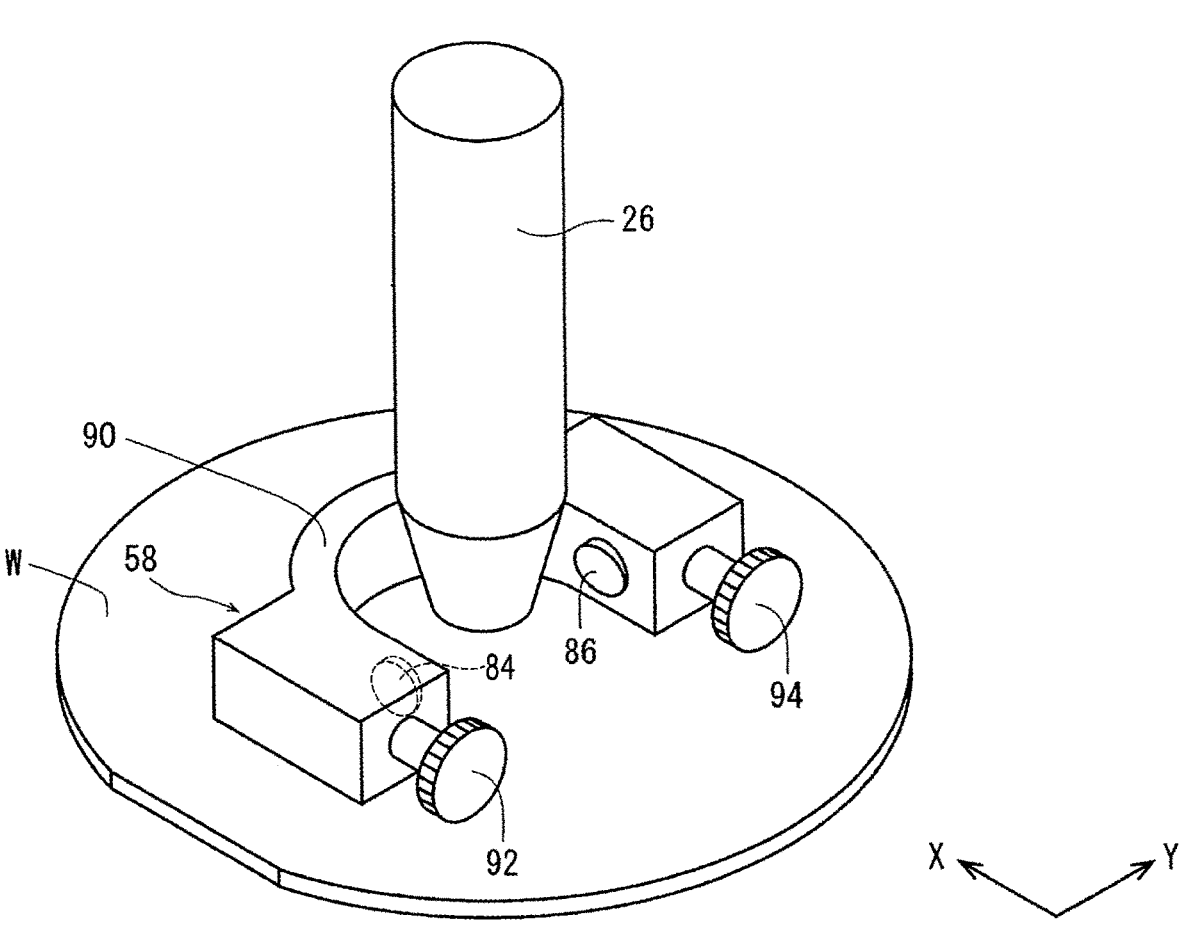
FIG. 9 is a perspective view of the beam condenser and a second upper surface position detecting unit of the laser processing apparatus illustrated in FIG. 1.
Figure 10:
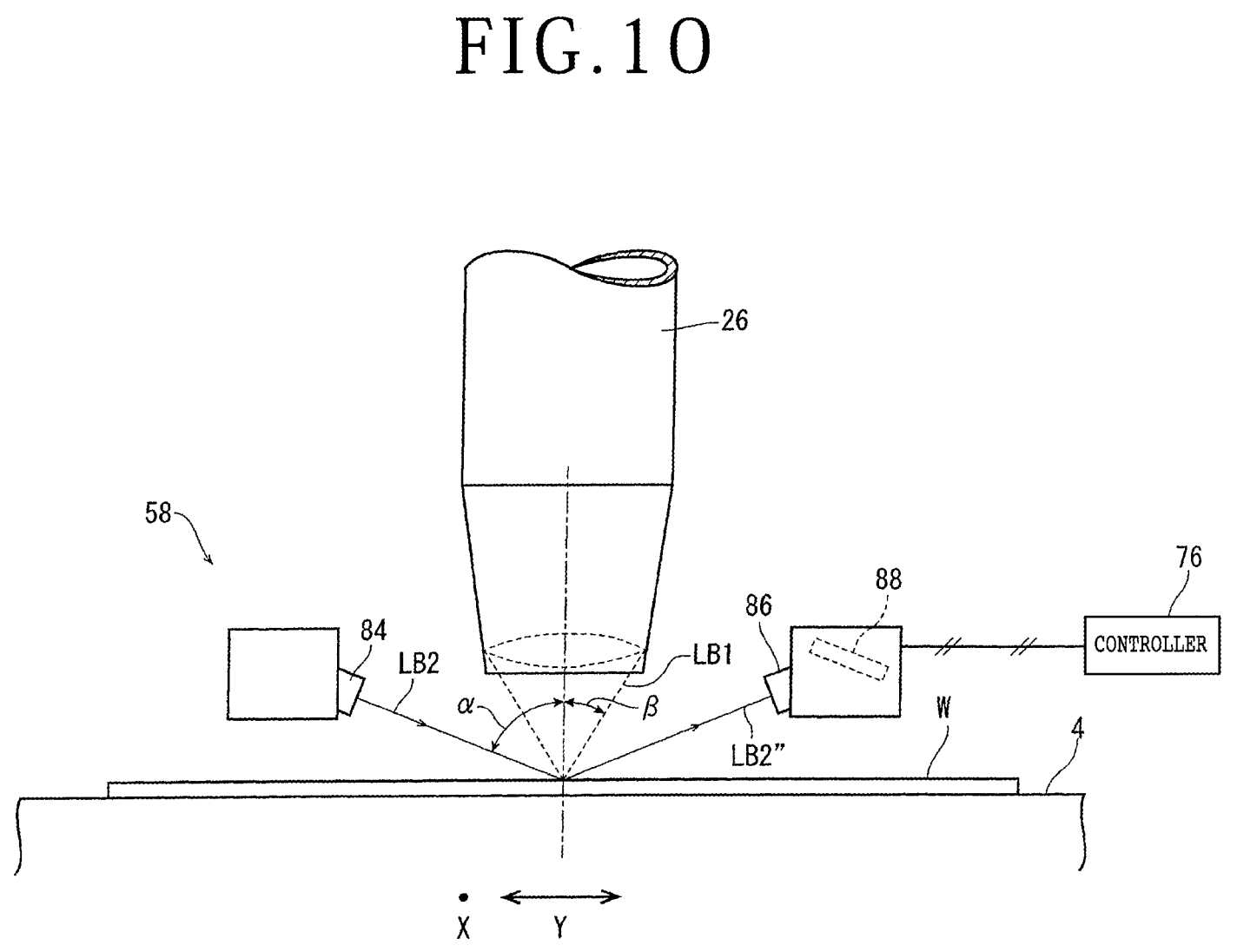

As illustrated in FIGS. 9 and 10, the second upper surface position detecting unit 58 includes a light applying end member 84 for applying the detecting light LB2 emitted from the detecting light source 62 to the upper surface of the wafer W at an angle α of incidence, a light detecting end member 86 for detecting reflected light LB2" produced when the detecting light LB2 applied by the light applying end member 84 is reflected by the upper surface of the wafer W, and an image sensor 88 (see FIG. 10) for measuring the position of the reflected light LB2" detected by the light detecting end member 86.

According to the present embodiment, the second upper surface position detecting unit 58 also includes a U-shaped casing 90 (see FIG. 9) supported on the upper arm of the housing 32 of the laser beam applying unit 6 by a suitable bracket, not illustrated. The light applying end member 84 and the light detecting end member 86 are tiltably mounted on the casing 90. As illustrated in FIG. 10, the light applying end member 84 and the light detecting end member 86 are spaced from each other along the Y-axis with the beam condenser 26 interposed therebetween.

As illustrated in FIG. 2, the detecting light LB2 emitted from the detecting light source 62 is reflected by the first beam splitter 64 and introduced into the casing 90 of the second upper surface position detecting unit 58. The detecting light LB2 introduced into the casing 90 is applied from the light applying end member 84 to the upper surface of the wafer W held on the chuck table 4 at the angle α of incidence, as illustrated in FIG. 10.

As illustrated in FIG. 10, the angle α of incidence represents an angle between a straight line perpendicular to the upper surface of the chuck table 4 and the detecting light LB2 applied from the light applying end member 84. The angle α of incidence is set to an angle larger than a beam focusing angle β of the beam condenser 26 and smaller than 90 degrees (β<α<90). The position where the detecting light LB2 is applied from the light applying end member 84 to the upper surface of the wafer W is essentially aligned with the position where the processing laser beam LB1 is applied from the beam condenser 26 to the wafer W.

Figure 11:
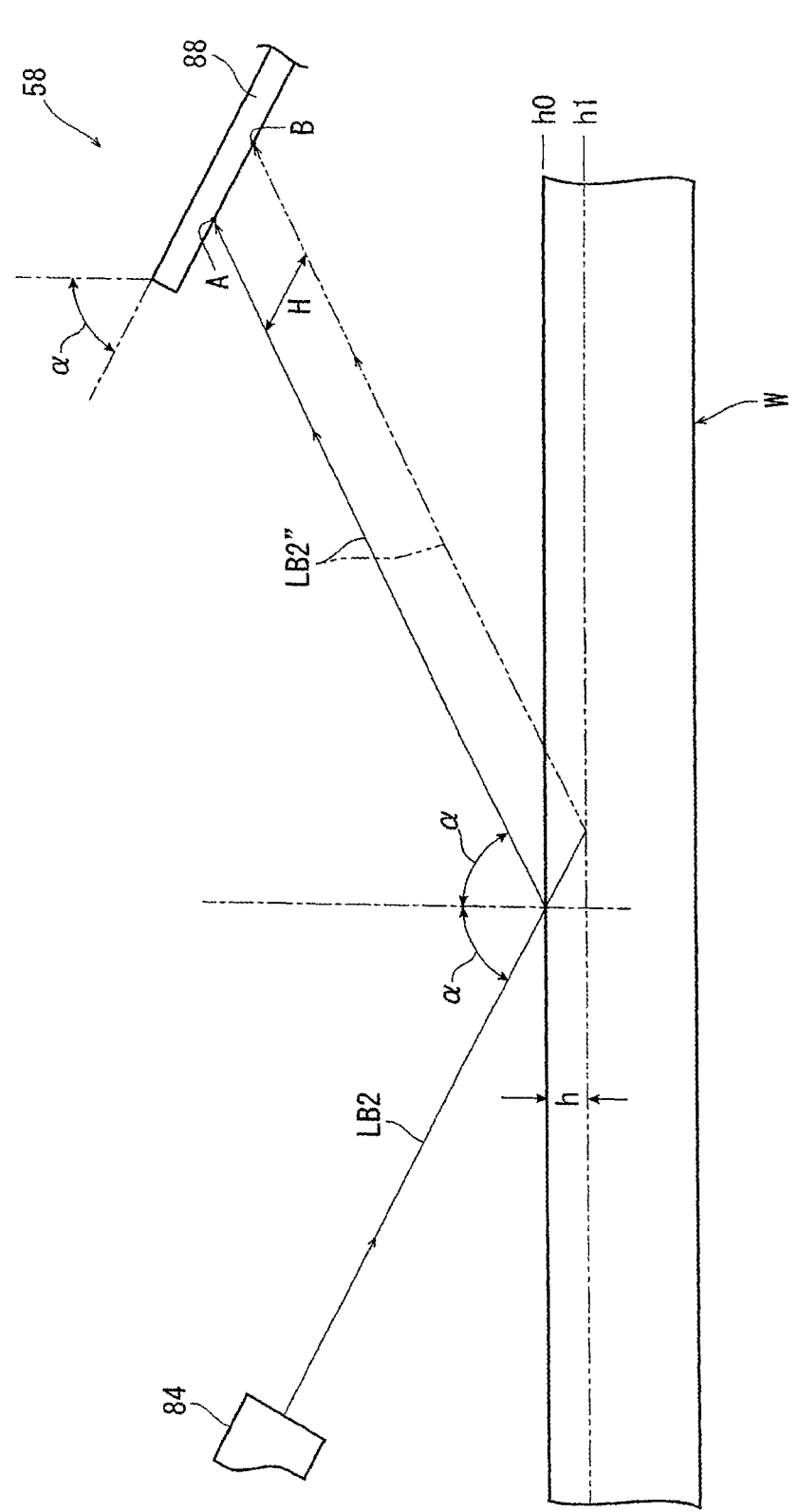
FIG. 11 is a schematic view illustrating an optical path of the detecting light at the time the position of the upper surface of the wafer is a reference position and an optical path of the detecting light at the time the position of the upper surface of the wafer has varied from the reference position by a distance h.

The light detecting end member 86 is disposed in such a position that the detecting light LB2 applied from the light applying end member 84 and bouncing off the upper surface of the wafer W by way of regular reflection reaches the light detecting end member 86. As illustrated in FIG. 11, the image sensor 88 is inclined to the upper surface of the chuck table 4 such that the image sensor 88 has its detecting surface lying at the angle α with respect to a straight line perpendicular to the upper surface of the chuck table 4.

As illustrated in FIG. 9, the casing 90 has a pair of angle adjusting knobs 92 and 94 for adjusting the respective angles at which the light applying end member 84 and the light detecting end member 86 are tilted. When the angle adjusting knobs 92 and 94 are turned, the respective angles at which the light applying end member 84 and the light detecting end member 86 are tilted are changed to adjust the angle α of incidence at which the detecting light LB2 is applied from the light applying end member 84 to the upper surface of the wafer W and the angle at which the light detecting end member 86 detects the detecting light LB2 reflected by the upper surface of the wafer W.

When the upper surface of the wafer W is in a solid-line position illustrated in FIG. 11, the detecting light LB2 that is applied from the light applying end member 84 to the upper surface of the wafer W bounces off the upper surface of the wafer W and is detected by the image sensor 88 at a point A (see FIG. 11), as indicated by a solid line. When the upper surface of the wafer W is in a two-dot-and-dash-line position illustrated in FIG. 11, the detecting light LB2 that is applied from the light applying end member 84 to the upper surface of the wafer W bounces off the upper surface of the wafer W and is detected by the image sensor 88 at a point B (see FIG. 11), as indicated by a two-dot-and-dash line. The image sensor 88 outputs data representing the position where the detecting light LB2 reaches the image sensor 88 to the controller 76.

The controller 76 calculates the position of the upper surface of the wafer W on the basis of the position on the image sensor 88 of the reflected light LB2" detected by the image sensor 88. Specifically, the controller 76 calculates a displacement h of the position of the upper surface of the wafer W on the basis of a distance H between the points A and B detected by the image sensor 88 (h=H cos α).

It is assumed that the position of the upper surface of the wafer W at the time the image sensor 88 detects the reflected light LB2" at the point A is used as a reference position h0. Since the displacement h of the position of the upper surface of the wafer W at the time the image sensor 88 detects the reflected light LB2" at the point B can be calculated according to h=H cos α, the controller 76 can calculate a position h1 of the upper surface of the wafer W at the time the image sensor 88 detects the reflected light LB2" at the point B according to h1=h0−h. The controller 76 thus operates with the second upper surface position detecting unit 58 to calculate the position of the upper surface of the wafer W on the basis of the position on the image sensor 88 of the reflected light LB2" detected by the image sensor 88.

As illustrated in FIG. 2, the selector 60 includes a pair of first and second shutters 96 and 98 that are movable between different positions, a first actuator, not illustrated, for moving the first shutter 96, and a second actuator, not illustrated, for moving the second shutter 98.

The first shutter 96 can selectively be brought by the first actuator into an allowing position indicated by solid lines in FIG. 2 where the first shutter 96 allows the detecting light LB2 having passed through the first beam splitter 64 to pass and a blocking position indicated by two-dot-and-dash lines in FIG. 2 where the first shutter 96 blocks the detecting light LB2 having passed through the first beam splitter 64.

The second shutter 98 can selectively be brought by the second actuator into an allowing position indicated by solid lines in FIG. 2 where the second shutter 98 allows the detecting light LB2 reflected by the first beam splitter 64 to pass and a blocking position indicated by two-dot-and-dash lines in FIG. 2 where the second shutter 98 blocks the detecting light LB2 reflected by the first beam splitter 64.

The selector 60 thus selects the detecting light LB2 branched by the first beam splitter 64 with the first shutter 96 and the second shutter 98.

Specifically, when the selector 60 is to select the first upper surface position detecting unit 56, the first actuator positions the first shutter 96 in the allowing position, and the second actuator positions the second shutter 98 in the blocking position.

Then, the detecting light LB2 emitted from the detecting light source 62 and having passed through the first beam splitter 64 is guided to the first upper surface position detecting unit 56. The detecting light LB2 emitted from the detecting light source 62 and reflected by the first beam splitter 64 is blocked by the second shutter 98. Therefore, the first upper surface position detecting unit 56 is selected.

When the selector 60 is to select the second upper surface position detecting unit 58, the first actuator positions the first shutter 96 in the blocking position, and the second actuator positions the second shutter 98 in the allowing position.

Then, the detecting light LB2 emitted from the detecting light source 62 and having passed through the first beam splitter 64 is blocked by the first shutter 96. The detecting light LB2 emitted from the detecting light source 62 and reflected by the first beam splitter 64 is guided to the second upper surface position detecting unit 58. Therefore, the second upper surface position detecting unit 58 is selected.

As illustrated in FIG. 1, the feeding mechanism 8 includes an X-axis feeding mechanism 100 for processing-feeding the chuck table 4 along the X-axis with respect to the laser beam applying unit 6 and a Y-axis feeding mechanism 102 for processing-feeding the chuck table 4 along the Y-axis with respect to the laser beam applying unit 6.

The X-axis feeding mechanism 100 has a ball screw 104 operatively coupled to the X-axis movable plate 12 and extending along the X-axis and an electric motor 106 for rotating the ball screw 104 about its central axis. The X-axis feeding mechanism 100 converts rotary motion of the electric motor 106 into linear motion with the ball screw 104 and transmits the linear motion to the X-axis movable plate 12, thereby moving the X-axis movable plate 12 in one of the X-axis directions along a pair of guide rails 10a on the base 10. The chuck table 4 on the X-axis movable plate 12 is thus processing-fed along the X-axis.

The Y-axis feeding mechanism 102 has a ball screw 108 operatively coupled to the Y-axis movable plate 14 and extending along the Y-axis and an electric motor 110 for rotating the ball screw 108 about its central axis. The Y-axis feeding mechanism 102 converts rotary motion of the electric motor 110 into linear motion with the ball screw 108 and transmits the linear motion to the Y-axis movable plate 14, thereby moving the Y-axis movable plate 14 in one of the Y-axis directions along a pair of guide rails 12a on the X-axis movable plate 12. The chuck table 4 on the Y-axis movable plate 14 is thus processing-fed along the Y-axis.

As illustrated in FIG. 1, the laser processing apparatus 2 further includes image capturing means 112 for capturing an image of a workpiece, i.e., the wafer W, including an area to be processed by the processing laser beam LB1 emitted from the laser beam applying unit 6. The image capturing means 112 is mounted on the lower surface of the distal end of the upper arm of the housing 32. The image capturing means 112 outputs data of a captured image to the controller 76.

A process of processing the wafer W on the laser processing apparatus 2 described above will be described in detail below. According to the present embodiment, first, the wafer W is placed on the upper surface of the chuck table 4. Then, the suction means fluidly connected to the suction chuck 20 is actuated to hold the wafer W under suction on the upper surface of the suction chuck 20. Then, the X-axis feeding mechanism 100 is actuated to position the chuck table 4 directly below the image capturing means 112.

When the chuck table 4 has been positioned directly below the image capturing means 112, the image capturing means 112 captures an image of the wafer W on the chuck table 4. Then, the controller 76 adjusts a positional relation between the wafer W and the beam condenser 26 on the basis of the data of the captured image of the wafer W transmitted from the image capturing means 112. Specifically, the controller 76 aims the processing laser beam LB1 at the area of the wafer W to be processed and adjusts the focused spot P of the processing laser beam LB1 to a predetermined position, e.g., a position in the wafer W at a predetermined depth from the upper surface of the wafer W.

The selector 60 selects either the first upper surface position detecting unit 56 or the second upper surface position detecting unit 58. First, it is assumed that the selector 60 selects the first upper surface position detecting unit 56.

When the selector 60 is to select the first upper surface position detecting unit 56, the first actuator positions the first shutter 96 in the allowing position, and the second actuator positions the second shutter 98 in the blocking position, as described above.

When the selector 60 has selected the first upper surface position detecting unit 56, the controller 76 controls the laser beam applying unit 6 to apply the processing laser beam LB1 from the beam condenser 26 to the wafer W while controlling the feeding mechanism 8 to move the chuck table 4 with respect to the laser beam applying unit 6 in order to cause the focused spot P of the processing laser beam LB1 to pass successively through areas to be processed of the wafer W. The controller 76 also controls the first upper surface position detecting unit 56 to apply the detecting light LB2 from the beam condenser 26 to the wafer W and detect the position of the upper surface of the wafer W. The controller 76 adjusts the height of the focused spot P of the processing laser beam LB1 on the basis of the detected position of the upper surface of the wafer W.

When the detecting light LB2 is applied to the wafer W while the first upper surface position detecting unit 56 is being selected by the selector 60, the first photodetector 72 sends a voltage signal representing the amount of the detected returning light LB2' to the controller 76, and the second photodetector 74 sends a voltage signal representing the amount of the detected returning light LB2' to the controller 76.

The controller 76 then calculates the position of the upper surface of the wafer W from the comparison between the amount of the returning light LB2' detected by the first photodetector 72 and the amount of the returning light LB2' detected by the second photodetector 74, and controls the angle adjusting actuators 48 and 54 of the first and second galvanoscanners 38 and 40 of the focused spot position adjuster 28 on the basis of the calculated position of the upper surface of the wafer W.

In this manner, the laser processing apparatus 2 according to the present embodiment positions the focused spot P of the processing laser beam LB1 in the wafer W held on the chuck table 4 by controlling the focused spot position adjuster 28 depending on the position of the upper surface of the wafer W calculated by the first upper surface position detecting unit 56 selected by the selector 60.

Consequently, since the distance from the upper surface of the wafer W to the focused spot P of the processing laser beam LB1 is kept constant, the laser beam applying unit 6 can perform a desired laser processing process to produce a modified layer, for example, in the wafer W at a predetermined depth from the upper surface of the wafer W in successive areas to be processed parallel to the upper surface of the wafer W.

Now, it is assumed that the selector 60 selects the second upper surface position detecting unit 58. When the selector 60 is to select the second upper surface position detecting unit 58, the first actuator positions the first shutter 96 in the blocking position, and the second actuator positions the second shutter 98 in the allowing position, as described above. The detecting light LB2 emitted from the detecting light source 62 is then guided to the second upper surface position detecting unit 58, which applies the detecting light LB2 from the light applying end member 84 to the upper surface of the wafer W on the chuck table 4.

When the selector 60 has selected the second upper surface position detecting unit 58, the controller 76 controls the laser beam applying unit 6 to apply the processing laser beam LB1 from the beam condenser 26 to the wafer W while controlling the feeding mechanism 8 to move the chuck table 4 with respect to the laser beam applying unit 6 in order to cause the focused spot P of the processing laser beam LB1 to pass successively through areas to be processed of the wafer W. The controller 76 also controls the second upper surface position detecting unit 58 to apply the detecting light LB2 from the light applying end member 84 to the wafer W and detect the position of the upper surface of the wafer W. The controller 76 adjusts the height of the focused spot P of the processing laser beam LB1 on the basis of the detected position of the upper surface of the wafer W.

When the detecting light LB2 is applied to the wafer W while the second upper surface position detecting unit 58 is being selected by the selector 60, the image sensor 88 of the second upper surface position detecting unit 58 sends positional information of the reflected light LB2'' detected by the image sensor 88 to the controller 76.

The controller 76 calculates the position of the upper surface of the wafer W on the basis of the positional information of the reflected light LB2'' detected by the image sensor 88, and controls the angle adjusting actuators 48 and 54 of the first and second galvanoscanners 38 and 40 of the focused spot position adjuster 28 on the basis of the calculated position of the upper surface of the wafer W.

In this manner, the laser processing apparatus 2 according to the present embodiment positions the focused spot P of the processing laser beam LB1 in the wafer W held on the chuck table 4 by controlling the focused spot position adjuster 28 depending on the position of the upper surface of the wafer W calculated by the second upper surface position detecting unit 58 selected by the selector 60.

Consequently, since the distance from the upper surface of the wafer W to the focused spot P of the processing laser beam LB1 is kept constant, the laser beam applying unit 6 can perform a desired laser processing process to produce a modified layer, for example, in the wafer W at a predetermined depth from the upper surface of the wafer W in successive areas to be processed parallel to the upper surface of the wafer W.

As described above, the laser processing apparatus 2 according to the present embodiment can suitably select either the first upper surface position detecting unit 56 or the second upper surface position detecting unit 58 depending on features of the wafer W, e.g., the kind of the wafer W, the surface state of the wafer W, and the like, the laser processing apparatus 2 is able to solve the problem of uneconomically having to keep both a laser processing apparatus including a measuring instrument of the first type and a laser processing apparatus including a measuring instrument of the second type ready for use.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing apparatus comprising:
a chuck table for holding a wafer thereon;
a laser beam applying unit for applying a laser beam to the wafer held on the chuck table; and
a feeding mechanism for processing-feeding the chuck table and the laser beam applying unit relatively to each other in X-axis directions and Y-axis directions perpendicular to the X-axis directions,
wherein the laser beam applying unit includes:
a laser oscillator for emitting a laser beam,
a beam condenser for focusing the laser beam emitted from the laser oscillator into a focused spot and positioning the focused spot in the wafer held on the chuck table,
a focused spot position adjuster disposed between the laser oscillator and the beam condenser for adjusting the position of the focused spot, and
an upper surface position detector for detecting a position of an upper surface of the wafer,
the upper surface position detector including a first upper surface position detecting unit, a second upper surface position detecting unit, and a selector for selecting either the first upper surface position detecting unit or the second upper surface position detecting unit depending on a feature of the wafer,

wherein the first upper surface position detecting unit includes:

a detecting light source, a combiner for combining detecting light that is emitted from the detecting light source and that has passed through a first beam splitter with the laser beam between the laser oscillator and the focused spot position adjuster, a second beam splitter for branching returning light that is reflected by the upper surface of the wafer held on the chuck table when the detecting light that has passed through the focused spot position adjuster and the beam condenser is applied to the wafer and that is also reflected by the combiner and the first beam splitter, into a first optical path and a second optical path, a filter disposed on the first optical path for passing part of the branched returning light therethrough, a first photodetector for detecting the returning light that has passed through the filter, and a second photodetector disposed on the second optical path for detecting the branched returning light in its entirety, wherein the laser processing apparatus further comprises a controller for calculating the position of the upper surface of the wafer from a comparison between an amount of the returning light detected by the first photodetector and an amount of the returning light detected by the second photodetector,

the second upper surface position detecting unit includes:

a light applying end member for applying the detecting light emitted from the detecting light source to the upper surface of the wafer at an angle $\alpha$ of incidence, a light detecting end member for detecting reflected light produced when the detecting light applied by the light applying end member is reflected by the upper surface of the wafer, and an image sensor for measuring a position of the reflected light detected by the light detecting end member, and the controller calculates the position of the upper surface of the wafer on a basis of the position on the image sensor of the reflected light detected by the image sensor.

2. The laser processing apparatus according to claim 1, wherein the detecting light emitted from the detecting light source is guided to the first beam splitter, and the selector guides the detecting light branched by the first beam splitter selectively to the first upper surface position detecting unit and the second upper surface position detecting unit by switching a first shutter and a second shutter to different positions.

3. The laser processing apparatus according to claim 1, wherein the controller controls the focused spot position adjuster depending on the position of the upper surface of the wafer calculated on a basis of data from the first upper surface position detecting unit or the second upper surface position detecting unit selected by the selector.

\*    \*    \*    \*    \*